United States Patent [19]

Hess, II

[11] Patent Number: 4,507,569

[45] Date of Patent: Mar. 26, 1985

[54] ELECTRICAL CONTROL SYSTEM AND DRIVER

[75] Inventor: John E. Hess, II, Monroeville, Pa.

[73] Assignee: Conservolite, Inc., Oakdale, Pa.

[21] Appl. No.: 567,264

[22] Filed: Dec. 30, 1983

[51] Int. Cl.$^3$ .................... H05B 37/00; G05F 1/44
[52] U.S. Cl. .................... 307/130; 307/117; 307/140; 315/DIG. 4; 315/291; 323/321
[58] Field of Search ............ 307/38, 39, 117, 130, 307/140, 252 R, 252 J, 116, 252 UA; 323/319, 320, 321, 901, 905, 303, 289, 327; 315/DIG. 4, 291, 307

[56] References Cited

U.S. PATENT DOCUMENTS

| | | | |
|---|---|---|---|
| 3,421,027 | 1/1969 | Maynard et al. | 323/327 X |
| 3,509,450 | 4/1970 | McNulty | 323/303 |
| 3,638,102 | 1/1972 | Pelka | 323/303 X |
| 3,821,634 | 6/1974 | Sabolic | 323/319 X |
| 4,350,935 | 9/1982 | Spira et al. | 315/DIG. 4 X |
| 4,352,045 | 9/1982 | Widmayer | 315/DIG. 4 X |
| 4,358,716 | 11/1982 | Cordes et al. | 315/DIG. 4 X |
| 4,417,156 | 11/1983 | Fukui et al. | 307/252 J |
| 4,443,712 | 4/1984 | Gokita | 307/140 |

Primary Examiner—A. D. Pellinen
Assistant Examiner—Derek S. Jennings
Attorney, Agent, or Firm—Robert D. Yeager; Andrew J. Cornelius

[57] ABSTRACT

An electrical control system controls an electrical load device, particularly an inductive load such as the ballast of a gas discharge lamp which generates a back EMF when power is removed therefrom. The control system includes a first electronic switch for controlling the application of power to and withdrawal of power from the load and a second electronic switch which controls the first electronic switch. The second switch is responsive to a command signal preferably occurring between 90° and 180° of the AC power half wave to turn on and thus switch off the first switch which in turn withdraws power from the load. The circuit remains in this state until a predetermined circuit condition occurs at which point the potentials on the load and the AC power supply are at predetermined levels. The equal potential turns the second switch off, whereupon power is reapplied to the load by the first electronic switch. In an inductive load, the back EMF generated when the first switch withdraws power from the load serves as a feedback signal which is referenced against the AC power supply to determine an equal potential circuit condition.

17 Claims, 12 Drawing Figures

Current Thru $R_2$

Current Thru $R_4$

Current Thru $R_5$

Current Thru $R_1$

Voltage Across $S_3$

ELECTRICAL CONTROL SYSTEM AND DRIVER

BACKGROUND OF THE INVENTION

1. Field of the Invention

The invention relates to electrical control systems and, more particularly, to an electrical control system and driver which repeatedly applies power to and removes power from an electrical load to reduce the energy consumed by the load or to control its output.

2. Description of the Prior Art

As will be readily appreciated by those skilled in the art of electrical load control systems, the present invention can be utilized with a wide variety of types of electrical load apparatus. Accordingly, while the discussion of the invention and the prior art is primarily directed toward the control of fluorescent lights and fluorescent lighting systems, such a discussion is not to be construed as a limitation on the application of the present invention.

A gas discharge type lamp and its associated ballast are among the most difficult electrical loads to regulate and control. The term gas discharge lamp includes a fluorescent lamp with or without a separate heater, a high intensity discharge lamp and any lamp which typically exhibits a negative resistance characteristic. Such a lamp requires a ballast circuit to provide a stable operating condition when it is used with a standard AC power source. The ballast also provides additional striking voltage to start the lamp and, in some cases, to provide power for internal lamp cathode heaters. A good discussion of gas discharge lamps and the problems associated with controlling them can be found in U.S. Pat. No. 4,352,045 at column 1, line 22, through column 2, line 9.

It has been a long-standing objective to provide a control system for dimming gas discharge lamp assemblies to reduce energy consumption and the associated cost of operating the lamps. Generally, dimming is appropriate whenever the standard available light output of the lamps is not required due to ambient light conditions and desired light level.

Conventional approaches to gas discharge lamp control, such as those disclosed in U.S. Pat. Nos. 4,350,935 and 4,352,045, have produced, for example, circuits which disconnect the energizing voltage from the load during a portion of each cycle of the AC supply voltage and subsequently reapply energizing voltage to the load to effectively remove a portion of the energizing voltage from the load during each half cycle of supply voltage. The rapid potential change due to removal of supply voltage from the load causes a countereffect of control which is called back electromotive force, or EMF. The time at which all such conventional circuits reapply energizing voltage to the load during a half cycle of the supply voltage does not depend on the relative electrical potential between the load, due to back EMF, and the supply voltage. Accordingly, the conventional circuits nearly always reapply energizing voltage to the load when an electric potential exists between the supply voltage and the load that creates an extremely large and damaging voltage transient at the time the energizing voltage is reapplied to the load. The voltage transient can cause immediate destruction or shortened life of the control components and can create annoying audible noise.

Another problem is caused by the very fast switching times employed by many conventional circuits, relative to the 50 to 60 Hz voltage being supplied to the ballasts, which can cause shortened ballast life. Also, removing and applying energizing voltage from the load prior to the 90° point of each half cycle of the supply voltage causes high crest factors and very fast voltage changes which stress the ballast and lamp. Increased noise results from significant swings in voltage during the half cycle, which produce multiple harmonics within the audible range. Switching prior to the 90° point in each half cycle of the supply voltage causes the further problem that voltage of an amplitude sufficient to ignite the lamps may not be applied to the load, which will cause some lamps to be extinguished completely.

Accordingly, there is a need for a driver for the control system for a load that does not produce transients that are harmful to the load or the control components. Further, there is a need for a driver and control system for a load having an inductive component that does not produce any large voltage transients when the energizing voltage is applied to or removed from the load.

SUMMARY OF THE INVENTION

The invention provides a driver and a control system that employs the driver. The invention is used to control electrical load apparatus, including apparatus which presents an inductive load to the control system. The driver of the present invention includes a first electronic switching device, operatively connected to the load, which has a first state in which supply voltage is applied to the load and a second state in which supply voltage is not applied to the load. A second electronic switching device, operatively associated with the first electronic switching device effects the transition of the first electronic switching device between the first and second states thereof, and is selectively switchable between a first state and a second state. In the first state of the second switching device, the first switching device is in its first state and in the second state of the second switching device, the first switching device is in its second state. Accordingly, switching of the second switching device from its first state to its second state causes the first switching device to switch to its second state from its first state. In the system of the present invention the second switching device is switched into its second state by a command signal. The driver causes the second switching device to remain in its second state until a determinable circuit condition is present between the power supply and the load.

BRIEF DESCRIPTION OF THE DRAWING

The following detailed description of the preferred embodiments can be understood better if reference is made to the accompanying drawings, in which.

DETAILED DESCRIPTION OF THE PREFERRED EMBODIMENTS

Considering FIGS. 2A through 2G, a preferred embodiment of the driver of the present invention is described in detail. It is to be understood that the values of the various components associated with the present invention can be modified to meet various applications and requirements without departing from the spirit and scope of the invention. The drivers are described herein as they are used with a control system that controls the operation of one or more gas discharge lamps. As is stated above, the drivers provided by the present invention can be used with systems that control the operation of any, even noninductive, loads.

Figure 2G:
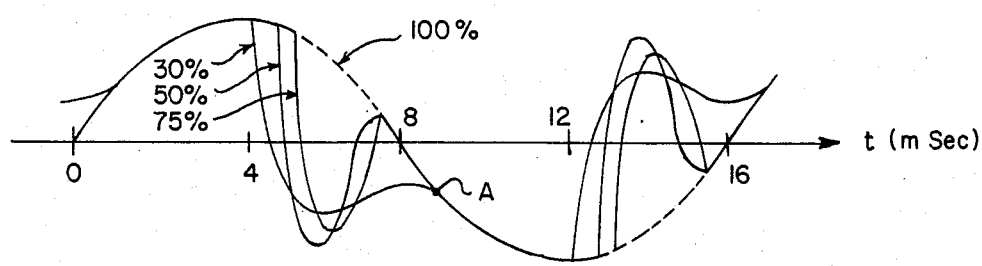
FIG. 2A is a schematic diagram of the preferred embodiment of the driver of the present invention and FIGS. 2B through 2G show wave forms taken at various test points of the driver.
Figure 2A:
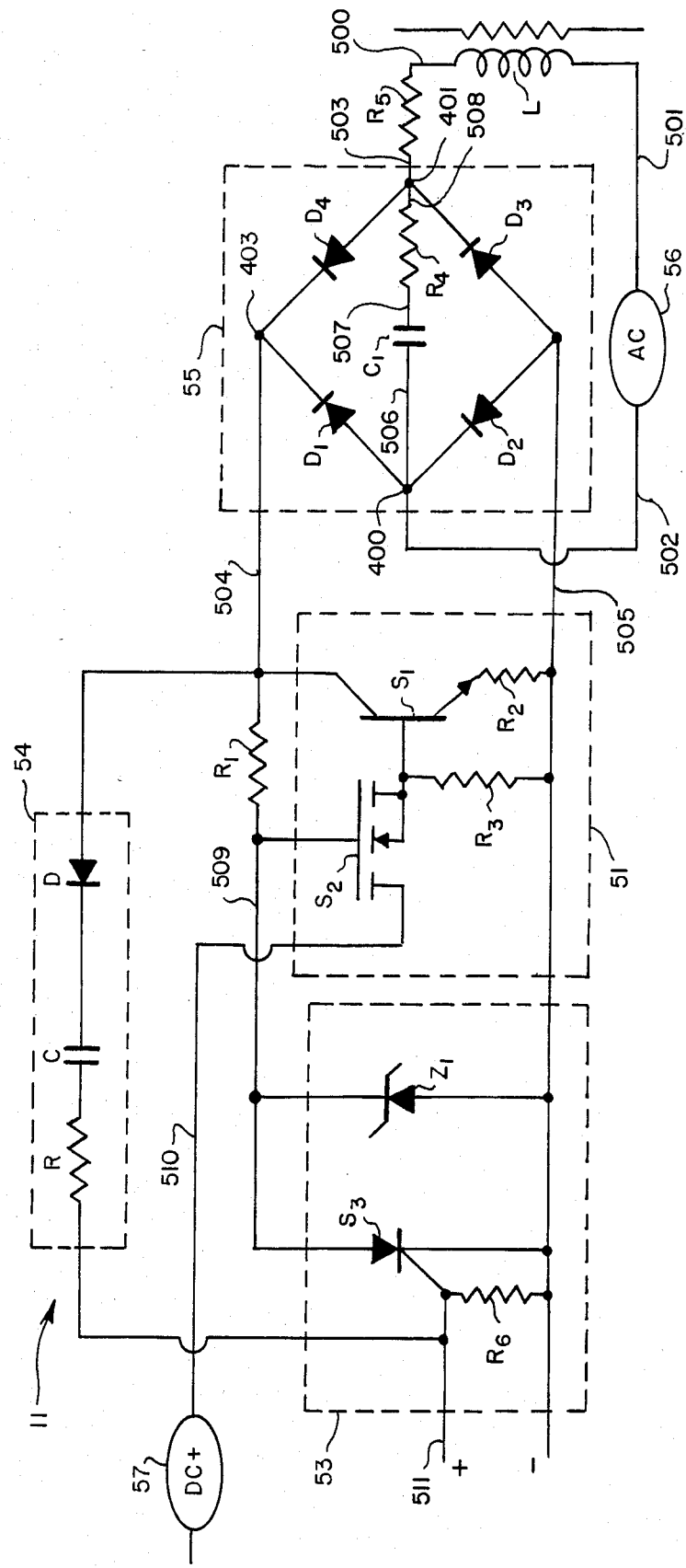

Driver 11, shown in FIG. 2A, can be viewed as having two modes of operation, mode A and mode B. Driver 11 includes a first electronic switching device, generally indicated at 51, a second electronic switching device 53, a full wave bridge rectifier with capacitor generally indicated at 55 and a zero cross circuit 54. By way of a general initial description of the manner in which driver 11 functions, the first mode of operation, or mode A, is a state of energizing voltage application to the load L from the AC power supply 56. In the second mode of operation, or mode B, energizing voltage from power supply 56 is removed from the load L, but control voltage is still applied to the control portions of the control circuit through bridge 55.

Driver 11 is electrically connected to load L, a gas discharge lamp, by leads 500 and 501. One side, the return, of AC power supply 56 is connected to load L with lead 501 and the remaining side of power supply 56 is connected to bridge 55 by a lead 502. Power supply 56 supplies AC energizing voltage to load L during mode A, and supplies control power to the control components of driver 11 during both modes A and B through bridge 55. A resistor R5 is shown as connected with lead 500 to load L and by lead 503 to bridge 55. Resistor R5 is included in FIG. 2A only for the purpose of providing a test measurement, as shown in FIG. 2D, and would be omitted from a commercial driver.

Bridge 55 includes four diodes D1, D2, D3 and D4 connected together in the configuration of a full wave bridge rectifier. Bridge 55 receives AC supply voltage from power supply 56 and produces rectified control power for the control portion of driver 11 and energizing voltage for load L along leads 504 and 505. A capacitor C1 is connected by lead 506 to point 400 of bridge 55 and by lead 507 to a resistor R4. The remaining side of resistor R4 is connected by lead 508 to point 401 of bridge 55. Capacitor C1 absorbs the power generated by the back EMF produced by load L when driver 11 switches from mode A to mode B. Resistor R4 is included in FIG. 2A only to provide a test measurement, as shown in FIG. 2C, and would not be included in a commercial driver.

Zero cross circuit 54, switch 53, switch 51 and resistor R1 constitute the control portion of driver 11. Resistor R1 is connected to lead 504 to output 403 of bridge 55 and by lead 509 to switches 51 and 53. Lead 504 also connects resistor R1 to zero cross circuit 54. The value of the resistance of resistor R1 affects the amount of voltage which driver 11 switches from mode A to mode B. The higher the resistance of resistor R1, the higher the voltage at which switching occurs, and the lower the phase angle at which driver 11 switches back to mode A.

Switch 51 includes a transistor S1. When transistor S1 is conducting, switch 51 is closed and energizing voltage is applied to load L through transistor S1 and bridge 55. When transistor S1 is not conducting, or cut off, switch 51 is open and energizing voltage from power supply 56 is not all applied to load L. The collector of transistor S1 is connected to line 504 and the emitter of transistor S1 is connected to line 505, the negative side of rectifier 55, through a resistor R2. Resistor R2 is used only to record current levels, if desired. The base of transistor S1 is connected to the source of a field effect transistor, or FET, S2. The source of FET S2 and the base of transistor S1 are tied to lead 505 through a resistor R3. Resistor R3 improves the cutoff condition of transistor S1. The gate of FET S2 is connected to line 509. The drain of FET S2 is connected by line 510 to a DC voltage supply 57. The level of the voltage produced by DC supply 57 must be sufficient to cause transistor S1 to enter its conducting, or saturated, state when it is applied to the base of transistor S1. Accordingly, when the voltage from the gate to the source of FET S2 is sufficiently high to cause FET S2 to conduct, which occurs during mode A, the voltage produced by DC source 57 is applied to the base of transistor S1 and transistor S1 enters its conducting state to permit application of energizing voltage to load L from AC source 56. When the voltage from the gate to the source of FET S2 is insufficiently high to cause FET S2 to conduct, which occurs during mode B, the base of transistor S1 is cut off from DC source 57 and transistor S1 enters its nonconducting state, which interrupts the application of energizing voltage to load L from AC supply 56.

The anode of the silicon controlled rectifier, or SCR, S3 of switch 53 is connected to lead 509. The cathode of SCR S3 is connected to the negative output 505 of bridge 55. A resistor R6 is used to bias SCR S3 in its nonconducting state. The gate of SCR S3 is connected to the high side of resistor R6 and to lead 511. Lead 511 carries the command signal from a suitable control circuit that causes SCR S3 to fire and conduct. A Zener diode Z1 is connected between leads 509 and 505 and provides protection for SCR S3 and FET S2.

When the gate of SCR S3 receives a suitable command signal, usually a pulse, along lead 511, SCR S3 begins conducting, which reduces the voltage between the gate and source of FET S2 to a level that is insufficient to cause FET S2 to conduct which, as described above, causes switch 51 to enter its second state, where it is not conducting.

Accordingly, when SCR S3 is not conducting, both FET S2 and transistor S1 are conducting, and, therefore, switch 51 is conducting, energizing power is applied to load L from AC source 56 through bridge 55 and transistor S1 and driver 11 is in mode A. When the gate of SCR S3 receives a command signal pulse along lead 511, SCR S3 begins conducting, and, therefore, switch 53 turns on, switch 51 turns off, application of energizing power to load L from AC supply 56 is interrupted and driver 11 is in mode B. As soon as driver 11 enters mode B, capacitor C1 begins to absorb the back EMF produced by load L. When the relative potential difference between load L, due to the back EMF, and the AC voltage reaches a level that is insufficient to maintain a current flow through SCR S3 of a magnitude to maintain its conducting state, SCR S3 turns off, switch 53 turns off, switch 51 self turns on, total energizing power is reapplied to load L and driver 11 reenters mode A. The level of the potential difference between the AC supply voltage and the voltage across load L that causes SCR S3 to stop conducting must be sufficiently low to prevent damaging current transients to occur when energizing voltage is reapplied to load L as driver 11 switches from mode B to mode A.

Zero cross circuit 54 ensures that application of power to driver 11 occurs only at the beginning of the first half cycle.

Figure 1:
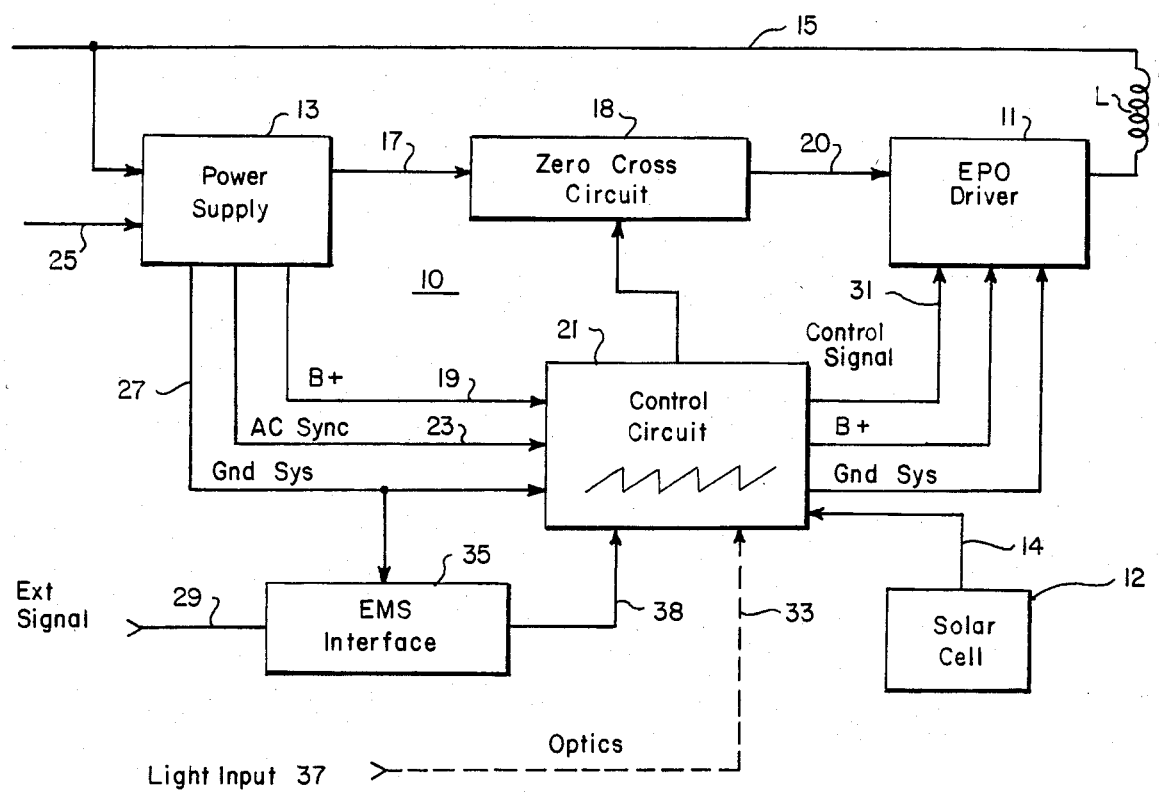
FIG. 1 is a block diagram of the preferred control system of the present invention, which incorporates a driver provided by the present invention.

FIG. 1 illustrates in block diagram form a preferred control system 10, which employs preferred driver 11, that is used to control one or more gas discharge lamps. Control system 10 causes driver 11 to repeatedly connect the AC supply 13 to and to disconnect the AC supply 13 from load L. The amount of time the AC supply 13 is disconnected from load L during each cycle of the AC voltage produced by AC supply 13 determines the extent of lamp dimming and, accordingly, the extent of energy savings realized. The longer the AC supply is disconnected from load L, the less light is produced by the load L and the greater are the energy savings realized. In the preferred embodiment, AC voltage is always applied to load L during the peak, positive or negative, of each half cycle to ensure that ignition voltage is always applied to the lamps of load L. Accordingly, control system 10 applies to load L a sinusoidal voltage with gaps or notches created when control system 10 disconnects the AC supply from load L. The greater the width of the gap in each cycle of AC supply voltage, the less light is output and the greater the energy savings realized. In the preferred embodiment, the AC supply is initially switched off in a half cycle, that is, the first time driver 11 switches from mode A to mode B during a half cycle, beyond the 90° phase angle to ensure that proper ignition voltage is applied to load L during each half cycle.

As can be ascertained from the discussion of driver 11 above, the angle at which driver 11 switches from mode B to mode A is determined by the angle at which the relative potential difference between load L, due to its back EMF, and the AC supply voltage is reduced to a predetermined level. Therefore, the width of the gaps created in the AC supply voltage is determined by the angle at which driver 11 first switches from mode A to mode B in each half cycle. The control system 10, and the inputs to it that represent desired light output of load L, must be calibrated to achieve proper lighting.

The electrical load apparatus L, comprising at least one gas discharge lamp, is in electrical communication with a power supply 13 through line 15 and through driver 11, line 17, zero cross circuit 18, and line 20. Line 15 is the return and line 25 is the main supply. The power supply 13 can consist of, for example, a transformer type or capacitor charge pump type. Through the power supply 13, an appropriate DC voltage B+ is provided along line 19 to the control circuit 21 and to driver 11 by control circuit 21. Voltage B+ can be the DC supply 57 shown in FIG. 2A. The control circuit 21 is also provided with an AC synchronous voltage along line 23 that is synchronous with the AC line power provided through input lines 25 and 15 of the power supply 13. An appropriate ground system is provided by line 27. An EMS interface circuit can supply commands pertaining to the desired light output of load L along line 38 to control circuit 21. Alternately, direct light input, representing desired light output of load L, can be input to a light sensitive device, as indicated by dashed line 33, that converts the light commands to electrical command signals. Also, as is indicated in FIG. 1, the external commands can be provided to control circuit 21 by a polycrystalline silicon solar cell 12 which produces a signal on line 14 having a level that is proportional to the level of the light received by solar cell 12.

Control circuit 21 is a phase control circuit which applies a control signal to driver 11. Control circuit 21 receives the AC synchronous signal along line 23 and uses it to generate a ramp signal, the frequency of which is twice the frequency of the AC synchronous signal on lines 23. Control circuit 21 compares the ramp signal with the external control signal provided at 29 or 37, as will be hereinafter explained, to generate a command or control signal to driver 11 along line 31. The command signal provided to driver 11 along line 31 represents a voltage phase delay, that is, the angle at which driver 11 first switches from mode A to mode B for each half cycle. A voltage phase delay of 90° represents the preferred maximum reduction of voltage to the load L, while an increase of the phase delay of up to about 180°, for example, represents a minimum level of voltage reduction.

EMS circuit 35 can be any suitable energy management system that coordinates lighting control for more than one system 10.

The external control signal provided along line 29 is converted into a DC voltage level which control circuit 21 converts into the desired phase angle delay. In the case of a voltage phase delay of 90°, the DC voltage level would be equal to one-half of the peak voltage of the ramp signal of control circuit 21. Control circuit 21 compares the command signal on line 38 with the ramp signal. Each time the ramp signal crosses the command signal, control circuit 21 provides to driver 11 a pulse that causes driver 11 to disconnect the AC supply 13 from load L. The higher the level of the command signal on line 38, the narrower the gap created in each cycle of energizing voltage applied to load L, and the greater the light level produced by load L.

Zero cross circuit 18 is conventional and ensures that, on start-up, application of power to driver 11 occurs at the beginning of a half cycle and that deenergization of driver 11 occurs at the end of a half cycle. If driver 11 has a zero cross circuit integral with it, for example, circuit 54 shown in FIG. 2A, circuit 18 is not necessary.

Figure 2B:
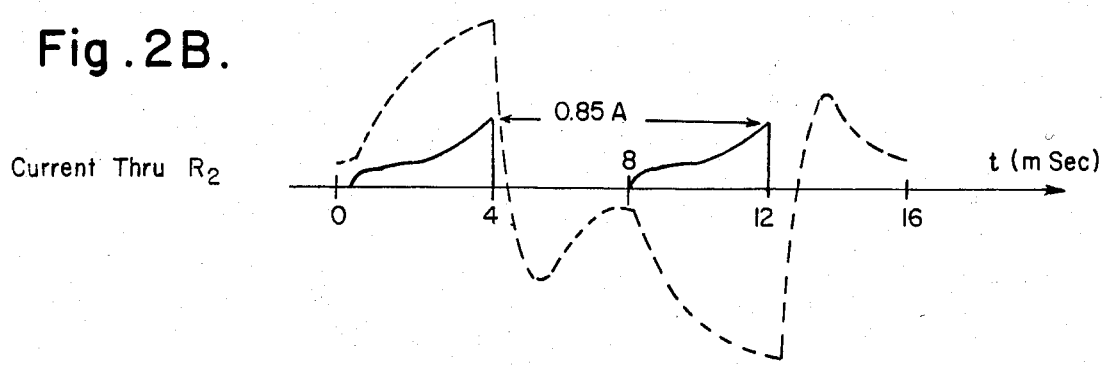
Figure 2C:
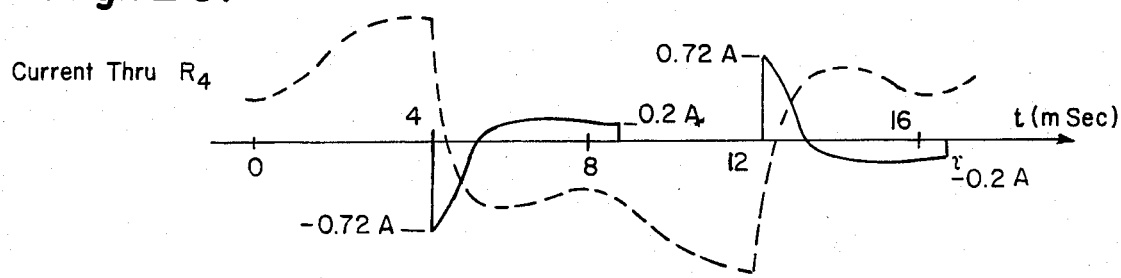
Figure 2D:
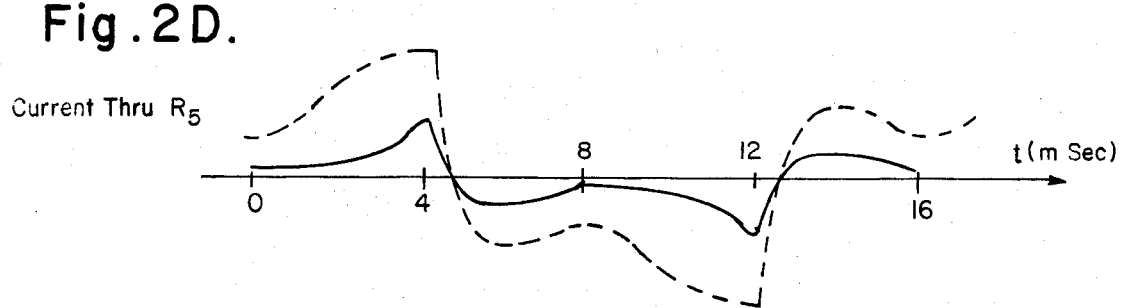
Figure 2E:
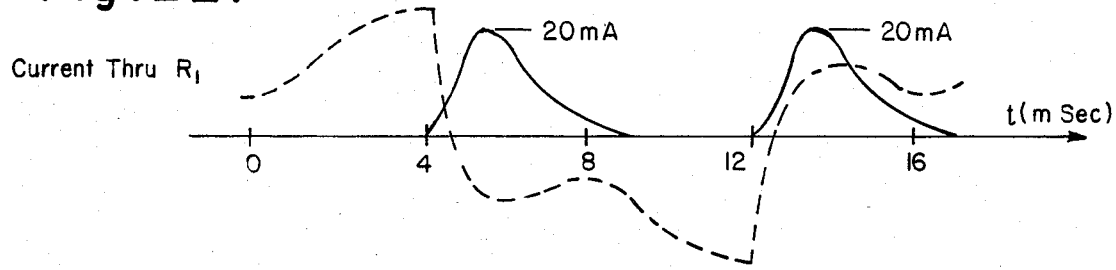
Figure 2F:
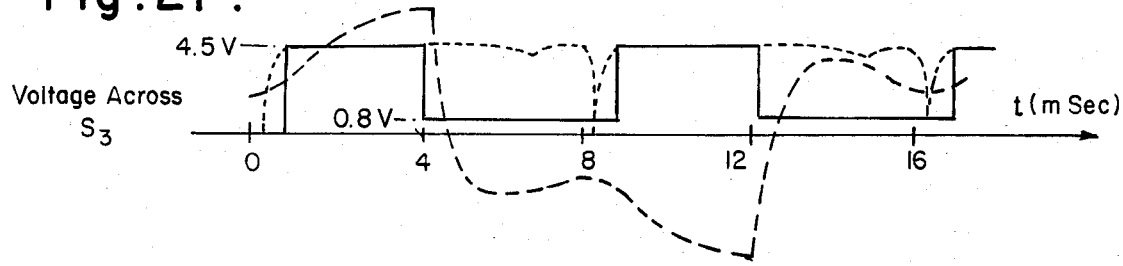

FIGS. 2B through 2G show in detail current and voltage wave forms for the two modes of operation of driver 11. As is indicated in solid lines in those figures, FIG. 2B shows the current flowing through resistor R2, FIG. 2C shows the current flowing through resistor R4, FIG. 2D shows the current flowing through resistor R5 and FIG. 2E shows the current flowing through resistor R1. The wave forms shown in dashed lines in FIGS. 2B through 2E show the voltage appearing across the load. The solid line alone shown in FIG. 2F represents the voltage appearing across SCR S3 in mode B for turning off at 90°; the dashed line in FIG. 2F represents the voltage across the load in mode B for 90° turn off; the dotted line in FIG. 2F represents 100% turn on or continuous mode A.

FIG. 2G shows the voltage applied to load L and shows the gaps created in the AC supply voltage for 30%, 50% and 75% application of AC supply voltage. The dashed line shown in FIG. 2G shows application of 100% of AC supply voltage.

Alternate embodiments of the controller of the present invention are shown in FIGS. 3, 4, 5 and 6. Again, the values of the various components associated with these embodiments can be modified to meet various applications and requirements.

Figure 3:
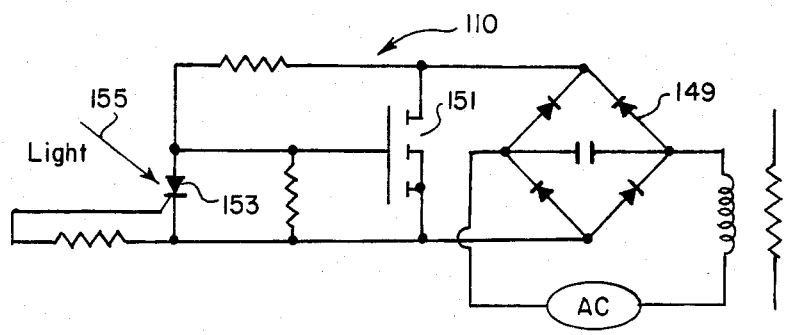
FIG. 3 is a schematic diagram of an alternate embodiment of the driver of the present invention for use with a relatively light inductive load, such as two gas discharge lamps.

In each of the alternate embodiments represented in FIGS. 3, 4, 5 and 6, the load L is shown as an inductive load with a capacitor in series with the AC supply. However, the controller can be used with a resistive load by the removal of the capacitor. The operation and functioning of each of the drivers shown in FIGS. 3 through 6 is identical with those of driver 11 with the exceptions being described below. FIG. 3 shows a driver 110 having a first switch, FET 151, operated by a second switch 153. Since driver 110 is designed for use with a control system that controls two lamps or less, FET 151 can handle the relatively low current that must be supplied to load L. Accordingly, the transistor, designated S1 in FIG. 1, is not needed. Further, driver 110 illustrates an alternate means of switching on switch 153. Switch 153 is a photo SCR which responds to direct light-input, shown at 155 in FIG. 3. Also, driver 110 needs no separate DC power supply and is connected in series with the load L.

Figure 4:
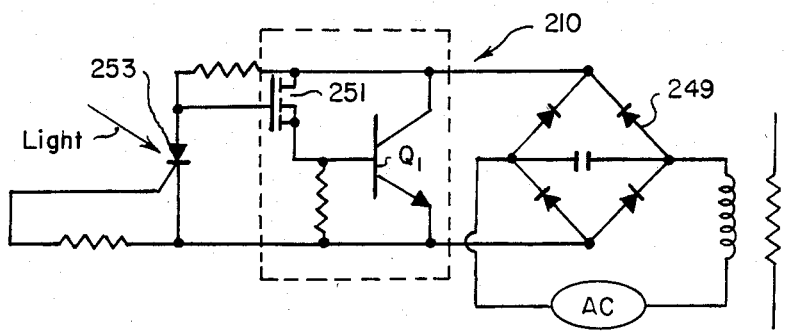
FIG. 4 is a schematic diagram of an alternate embodiment of the driver of the present invention for use with between about two and eight gas discharge lamps, or an equivalent inductive load.

FIG. 4 shows driver 210 which is designed for use with a control system that controls the operation of from about two to eight lamps. Driver 210 includes a first switch 251 and a second switch 253. Switch 251 requires a transistor Q1 to enable switch 251 to handle the higher current that must be supplied to a load of from two to eight lamps. Again, switch 253 is a photo SCR that accepts and operates on light input.

Figure 5:
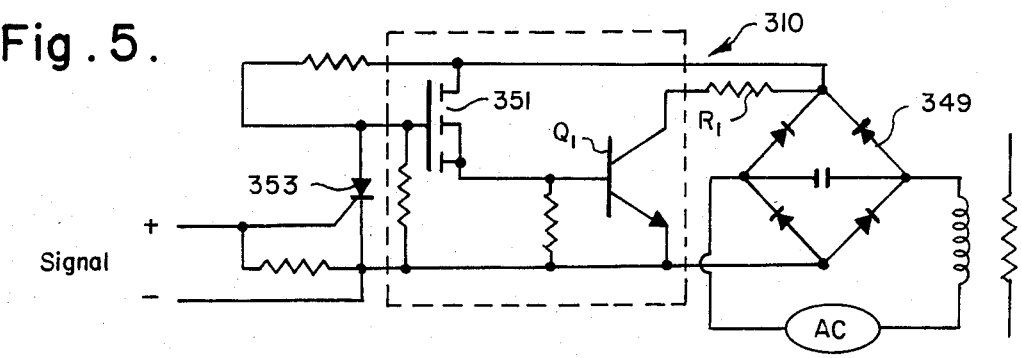
FIG. 5 is a schematic diagram of an alternate embodiment of the driver of the present invention for use with more than about eight gas discharge lamps, or an equivalent inductive load.

FIG. 5 shows driver 310 which is designed for use in a control system that controls the operation of more than about eight lamps. Resistor R1 must be introduced to ensure proper switching of transistor Q1 in view of increased current requirements of load L.

Figure 6:
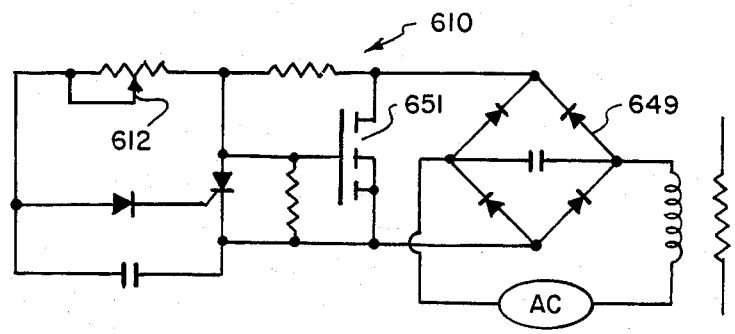
FIG. 6 is a schematic diagram of an alternate embodiment of the driver of the present invention that permits manual dimming of gas discharge lamps.

FIG. 6 shows a driver 610 which is similar to driver 110. However, driver 610 includes a potentiometer 612 which permits direct manual adjustment of lighting level and energy savings.

None of the drivers shown in FIGS. 3 through 6 require an external source of DC voltage. Further, those drivers are wired in series with the return or main supply of AC power supply 13, and do not require both AC lines. Therefore, each driver 110, 210, 310 and 610 can be used in a control system identical to control system 10, but with the B+ line eliminated.

What has been described is a control system and driver for use with electrical load devices, particularly devices which present inductive load characteristics to the power source. The driver of the invention controls and utilizes the back EMF generated by inductive loads when power is removed from the load as a feedback signal in determining when the power is to be reapplied to the load.

The following are component specifications representing preferred components for driver 11 shown in FIG. 2A:

C1 = 60 mfd.

S1 = MJ 10025
S2 = VN67AF
S3 = MCR 101
Z1 = 10 volt
R1 = 10K ohm
R2 = less than 1 ohn
R3 = 1K ohm
R6 = 6.2K ohm
R4 and R5 are used for test purposes only.

What is claimed is:

1. A driver for applying power to an electrical load device from a voltage supply comprising:

first electronic switching means adapted for connection to the load device that is capable of assuming a first state in which energizing voltage of a level that is sufficient to operate the load can be applied to the load by the voltage supply and a second state in which said energizing voltage cannot be applied to the load;

second electronic switching means operatively associated with said first electronic switching means for effecting the transition of said first electronic switching means between said first and second states thereof, said second electronic switching means being selectively switchable between a first state in which said second electronic switching means causes said first electronic switching means to assume its said first state, and a second state in which said second electronic switching means causes said first electronic switching means to assume its said second state, said second electronic switching means defining an input adapted to receive control signals, receipt by said second electronic switching means at said input of a control signal of a predetermined nature when said second electronic switching means is in its said first state causing said second electronic switching means to leave its said first state to assume its said second state, said second electronic switching means being automatically returned from said second state to said first state when the difference in electric potential between the supply and the load is less than a predetermined threshold.

2. The driver recited by claim 1 wherein said voltage supply is an AC voltage supply.

3. The driver recited by claim 2 wherein said predetermined threshold is substantially zero.

4. The driver recited by claim 2 wherein the electrical load device is an inductive load which generates a back EMF when supplied AC voltage is applied and subsequently removed from the load.

5. The driver recited by claim 2 wherein the AC voltage supply includes a full wave bridge rectifier adapted for connection the electrical load device and a capacitor adapted for series connection with the electrical load device and the AC voltage supply, and wherein the electrical load device presents an inductive load to said full wave bridge rectifier and said capacitor is responsive to reduce the voltage surge caused by the back EMF generated by said inductive load when supplied AC voltage is removed therefrom.

6. The driver recited by claim 2 wherein said control signal is provided to said second switching means no earlier than 90° into each AC voltage half wave produced by the AC voltage supply.

7. The driver recited by claim 2 wherein the control signal is provided by circuit means including a polycrystalline silicon solar cell which produces a determinable DC voltage.

8. The driver recited by claim 1 wherein the electrical load device comprises at least one gas discharge lamp and ballast.

9. An electrical control system for controlling the application of AC voltage to the ballast of a gas discharge lamp supplied from an AC voltage supply, said control system comprising:

means for selectively generating a command signal between about 90° and 180° of each AC voltage half wave produced by the AC voltage supply;

first electronic switching means adapted for connection to the ballast and the AC supply that is capable of assuming a first state in which AC energizing voltage of a level that is sufficient to operate the lamp is applied to the ballast by the AC supply, and a second state in which said energizing AC voltage is not applied to the ballast;

second electronic switching means operatively associated with said first electronic switching means for effecting the transition of said first electronic switching means between said first and second states thereof, said second electronic switching means being selectively switchable between a first state in which said second electronic switching means causes said first electronic switching means to assume its said first state, and a second state in which said second electronic switching means causes said first electronic switching means to assume its said second state, said second electronic switching means defining an input adapted to receive said command signals, receipt by said second electronic switching means at said input of a said command signal of a predetermined nature when said second electronic switching means is in its said first state causing said second electronic switching means to leave its said first state to assume its said second state, said second electronic switching means being automatically returned from said second state to said first state when the difference in electric potential between the AC supply and the ballast is less than a predetermined threshold.

10. The electrical control system recited by claim 9 wherein said threshold is substantially zero.

11. The electrical control system recited by claim 9 wherein the AC voltage supply includes a full wave bridge rectifier adapted for connection with the ballast and a capacitor adapted for series connection with the ballast and the AC voltage supply, and wherein the ballast presents an inductive load to said full wave bridge rectifier and said capacitor is responsive to reduce the voltage surge caused by the back EMF generated by the ballast when supplied AC voltage is removed.

12. The electrical control system recited by claim 9 wherein said command signal is provided by circuit means including a polycrystalline silicon solar cell which produces a determinable DC voltage.

13. In combination with at least one gas discharge lamp having an AC operated ballast transformer, an electrical control system for controlling the application of AC voltage from an AC supply to the primary winding of said ballast transformer comprising:

means for selectively generating a command signal between about 90° and 180° of the AC voltage half wave;

first electronic switching means operatively connected to said primary winding and the AC supply that is capable of assuming a first state in which AC energizing voltage of a level that is sufficient to operate the ballast is applied to the primary winding by the AC supply, and a second state in which said energizing AC voltage is not applied to the primary winding;

second electronic switching means responsive to said command signal, operatively associated with said first electronic switching means for effecting the transition of said first electronic switching means between said first and second states thereof, said second electronic switching means being selectively switchable between a first state in which said second electronic switching means causes said first electronic switching means to assume its said first state, and a second state in which said second electronic switching means causes said first electronic switching means to assume its said second state, said second electronic switching means defining an input adapted to receive said command signals, receipt by said second electronic switching means at said input of a said command signal of a predetermined nature when said second electronic switching means is in its said first state causing said second electronic switching means to leave its said first state to assume its said second state, said second electronic switching means being automatically returned from said second state to said first state when the difference in electric potential between the AC supply and the primary winding is less than a predetermined threshold.

14. A driver for applying AC power from an AC supply to the ballast of a gas discharge lamp comprising:

first electronic switching means adapted for connection to the ballast and the AC supply that is capable of assuming a first state in which AC energizing voltage of a level that is sufficient to operate the lamp is applied to the ballast by the AC supply, and a second state in which said energizing AC voltage is not applied to the ballast;

second electronic switching means operatively associated with said first electronic switching means for effecting the transition of said first electronic switching means between said first and second states thereof, said second electronic switching means being selectively switchable between a first state in which said second electronic switching means causes said first electronic switching means to assume its said first state, and a second state in which said second electronic switching means causes said first electronic switching means to assume its said second state, said second electronic switching means defining an input adapted to receive control signals, receipt by said second electronic switching means at said input of a control signal of a predetermined nature when said second electronic switching means is in its said first state causing said second electronic switching means to leave its said first state to assume its said second state, said second electronic switching means being automatically returned from its said second state to its said first state when the difference in electric potential between the AC supply and the ballast is less than a predetermined threshold.

15. A driver for supplying variable AC power to the ballast of a gas discharge lamp from an AC supply comprising:
- a first electronic switch in series with the ballast and adapted for series connection to the AC supply, said first switch being adapted to be closed and opened, energizing AC voltage of a level that is sufficient to ensure proper ignition of the lamp being applied to the ballast when said first switch is closed, said energizing AC voltage not being applied to the ballast when said first switch is open, said first switch defining an input, receipt by said first switch at said input of a switch signal when said first switch is open causing said first switch to close and to remain closed until said switch signal is removed from said input;
- a second electronic switch connected in parallel with said first switch, said second switch being adapted to be opened and closed, said second switch causing said first switch to be closed when said second switch is open and said second switch causing said first switch to be open when said second switch is closed, said second switch defining an input adapted to receive control signals, receipt by said second switch at said control signal input of a control signal of a predetermined nature when said second switch is open causing said second switch to close, which causes said first switch to open and remove said energizing AC voltage from the ballast, said second switch opening, to close said first switch and apply said energizing AC voltage to the ballast, when said second switch is closed and the difference in electric potential between the ballast and the AC supply falls below a predetermined threshold.

16. The driver recited by claim 15 wherein said second switch is a silicon controlled rectifier, and said control signal input is the gate terminal of said rectifier.

17. The driver recited by claim 16 wherein said silicon controlled rectifier is photosensitive to permit light of a sufficient level to cause said control signal to be applied to said gate and close said rectifier.

* * * * *